(12) United States Patent
Furukawa (10) Patent No.: US 7,458,168 B2
(45) Date of Patent: Dec. 2, 2008

(54) CONCENTRICITY MEASURING APPARATUS AND METHOD, SQUARENESS MEASURING APPARATUS AND METHOD, AND CONCENTRICITY-SQUARENESS MEASURING APPARATUS AND METHOD

(75) Inventor: Ayumu Furukawa, Aizuwakamatsu (JP)

(73) Assignee: Olympus Medical Systems Corp. (JP)

( * ) Notice: Subject to any disclaimer, the term of this patent is extended or adjusted under 35 U.S.C. 154(b) by 42 days.

(21) Appl. No.: 11/670,741

(22) Filed: Feb. 2, 2007

(65) Prior Publication Data
US 2007/0180721 A1    Aug. 9, 2007

(30) Foreign Application Priority Data
Feb. 3, 2006    (JP) .............................. 2006-027598

(51) Int. Cl.
*G01B 5/252* (2006.01)
*G01B 5/24* (2006.01)

(52) U.S. Cl. .............................. 33/543; 33/535; 33/550; 33/555.2

(58) Field of Classification Search ................. 33/1 BB, 33/533, 535, 542, 543, 544, 548, 549, 550, 33/551, 553, 555, 555.2, 573
See application file for complete search history.

(56) References Cited

U.S. PATENT DOCUMENTS

| | | | | |
|---|---|---|---|---|
| 2,657,468 A | * | 11/1953 | Lyons ........................... | 33/543 |
| 2,692,439 A | * | 10/1954 | Wilson ......................... | 33/543 |
| 2,700,224 A | * | 1/1955 | Johnson ..................... | 33/199 R |
| 3,021,603 A | * | 2/1962 | Beeson ......................... | 33/548 |
| 3,814,958 A | * | 6/1974 | Heitmann .................... | 310/314 |
| 4,062,124 A | * | 12/1977 | Albertazzi .................... | 33/543 |
| 4,439,925 A | * | 4/1984 | Lock ............................ | 33/645 |
| 4,680,869 A | * | 7/1987 | Murkens ...................... | 33/533 |
| 2007/0180721 A1 | * | 8/2007 | Furukawa .................... | 33/543 |

FOREIGN PATENT DOCUMENTS

| | | | | |
|---|---|---|---|---|
| JP | 63016211 A | * | 1/1988 | |
| JP | 5-280957 | | 10/1993 | |
| JP | 10-40749 | | 2/1998 | |
| JP | 11-295005 | | 10/1999 | |
| JP | 2001-108425 | | 4/2001 | |
| JP | 2007205996 A | * | 8/2007 | |
| SU | 1322076 A | * | 7/1987 | |
| SU | 1434236 A | * | 10/1988 | |

* cited by examiner

*Primary Examiner*—R. A. Smith
(74) *Attorney, Agent, or Firm*—Ostrolenk, Faber, Gerb & Soffen, LLP (57) ABSTRACT

An apparatus for measuring concentricity of two holes at both ends of a cylindrical member includes a rotation unit supporting and rotating the cylindrical member about one of the holes, and an unit measuring the concentricity by measuring a relative position of an inner circumferential surface of the other hole to the center line of the one hole over the whole inner circumferential surface, while the member is rotated. An apparatus for measuring squareness of one end surface of a partition wall between the two holes in the cylindrical member to a longitudinal center line of the one hole includes, in addition to the rotation unit, an unit measuring the squareness by measuring a relative position of the one end surface of the partition wall along the longitudinal center line of the other hole over the whole circumference of the one end surface, while the member is rotated.

24 Claims, 8 Drawing Sheets

CONCENTRICITY MEASURING APPARATUS AND METHOD, SQUARENESS MEASURING APPARATUS AND METHOD, AND CONCENTRICITY-SQUARENESS MEASURING APPARATUS AND METHOD

CROSS-REFERENCE TO RELATED APPLICATIONS

This application is based upon and claims the benefit of priority from prior Japanese Patent Application No. 2006-027598, filed Feb. 3, 2006, the entire contents of which are incorporated herein by reference.

BACKGROUND OF THE INVENTION

1. Field of the Invention

The present invention relates to: an apparatus and method for measuring the concentricity of two holes formed at ends of a cylinder; an apparatus and method for measuring the squareness of at least one end surface of a partition wall between two holes formed at ends of a cylinder to the longitudinal center line of at least one hole; and an apparatus and method for measuring the concentricity of two holes formed at ends of a cylinder and the squareness of at least one end surface of a partition wall between the two holes to the longitudinal center line of at least one hole.

2. Description of the Related Art

A cylinder provided with two holes at ends is used as a barrel member to hold one or more optical members including an objective lens and a solid-state image pickup device, at the distal end of an insertion portion of an endoscope, for example.

Figure 13A:
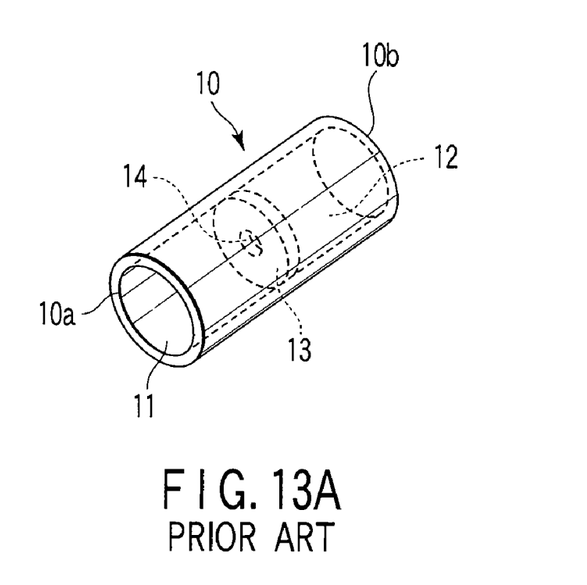
FIG. 13A is a schematic perspective view of a known cylindrical member whose concentricity of each of two holes to the longitudinal center line of the cylindrical member and the squareness of a partition wall between the two holes are measured in the concentricity-squareness measuring apparatus according to the one embodiment of the invention.
Figure 13B:
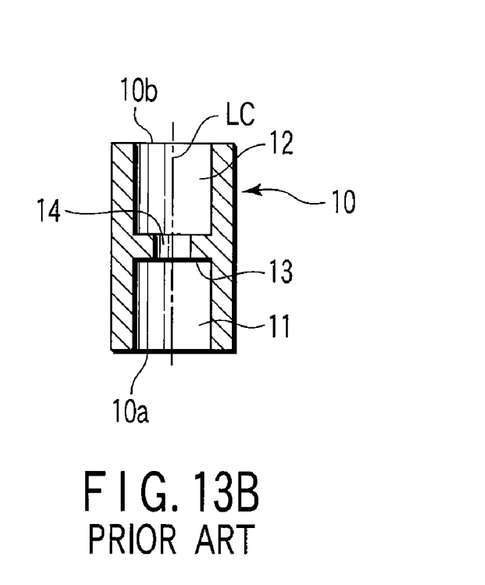
FIG. 13B is a schematic longitudinal sectional view of the cylindrical member of FIG. 13A.

FIGS. 13A and 13B show a perspective view and a sectional view of a barrel member 10 of an endoscope. The barrel member 10 is made of stainless steel, and provided with two holes 11 and 12 at end surfaces 10a and 10b. A partition wall 13 is provided between the two holes 11 and 12 in the barrel member 10. A through hole 14 having a diameter smaller than that of each of the two holes 11 and 12 is formed in the partition wall 13.

The holes 11 and 12 and through hole 14 are arranged concentrically with a longitudinal center line LC of the barrel member 10.

The diameter of each of the two holes 11 and 12 is about 0.8 mm-about 1 mm. One hole 11 houses one or more optical members including a not-shown objective lens, and the other hole 12 houses a not-shown solid-state image pickup device.

For satisfactorily imaging a desired subject captured by one or more optical members including the objective lens by the solid-state image pickup device in the barrel member 10, it is necessary to exactly align the optical axes of the optical members with a line crossing at right angles to the center of the solid-state image pickup device (hereinafter called the optical axis). Further, in a case at least one end surface of the partition wall 13 is used as a reference for positioning one or more optical members and/or solid-state image pickup device in the direction along the longitudinal center line LC of the barrel member 10, it is necessary that at least one end surface of the partition wall 13 is precisely rectangular to the optical axes of one or more optical members and/or solid-state image pickup device.

This requires that the concentricity of the holes 11 and 12 to the longitudinal center line LC of the barrel member 10 is high, and the squareness of at least one end surface of the partition wall 13 to the longitudinal center line LC is high.

The concentricity of the holes 11 and 12 to the longitudinal center line LC of the barrel member 10 is measured by using a measuring microscope or a laser measuring instrument. Here, at first the center of the barrel member 10 in its radial direction is obtained by measuring the outer diameter of the barrel member 10 by using the measuring microscope or the laser measuring instrument. Then, the center of each of the holes 11 and 12 in their radial direction is obtained by measuring the inner diameter of each of the holes 11 and 12 of the barrel member 10 by using the measuring microscope or the laser measuring instrument. Finally, the displacement of the radial center of each of the holes 11 and 12 from the radial center of the barrel member 10, that is, the concentricity of the radial center of each of the holes 11 and 12 to the radial center of the barrel member 10, is obtained.

However, in the above described conventional method for measuring the concentricity by using the measuring microscope or the laser measuring instrument, it is impossible to simultaneously measure the concentricities of the radial centers of the two holes 11 and 12 to the radial center of the barrel member 10. Further, each of the measuring microscope and the laser measuring instrument can measure only the inner diameter of each of the holes 11 and 12 at their positions close to their inlets, and cannot measure the inner diameter of each hole at its position far from the inlet. Thus, in the above described conventional concentricity measuring method using the measuring microscope or the laser measuring instrument, it is impossible to measure the concentricity of the whole inner surface of each of the holes 11 and 12 along the longitudinal center line LC of the barrel member 10.

Other various types of concentricity measuring apparatuses are well known. For example, Jpn. Pat. Appln. KOKAI Publication No. 5-280957 discloses an apparatus for measuring the concentricity of an inner circumferential surface to an outer circumferential surface in a cylinder. Here, a cylinder placed on a V-block is rotated in its circumferential direction by a rubber roller pressed on the outer circumferential surface of the cylinder. Light is projected on one end of the cylinder while it is rotated, and the other end of the cylinder is shot by a TV camera. The concentricity of the inner circumferential surface to the outer circumferential surface in the cylinder is measured by measuring a displacement of the inlet edge of the hole of the cylinder at the other end in its radial direction.

The conventional concentricity measuring apparatus cannot measure the concentricity, unless the light projected on the one end of the rotating cylinder passes through the hole up to the other end. Further, since the outer circumferential surface of the cylinder placed on the V-block is used as a reference for the concentricity, the outer circumferential surface of the cylinder must be precisely.

For example, Jpn. Pat. Appln. KOKAI Publication No. 10-40749 discloses an apparatus for measuring the eccentricity (i.e. the concentricity) of an outer circumferential surface to a rotation center in a roller. Here, the rotation center of the roller is fixed to a rotation shaft, and the roller is rotated when the rotation shaft is rotated by a motor. A measuring probe of a dial gauge held by a holding means contacts the outer circumferential surface of the rotating roller, and the eccentricity of the outer circumferential surface of the rotating roller is measured by the dial gauge.

The above described conventional eccentricity measuring apparatus cannot measure the concentricity of the inner circumferential surface of the hole to the outer circumferential surface of the cylinder.

Various types of squareness measurement unit are also well known. For example, Jpn. Pat. Appln. KOKAI Publication No. 2001-108425 discloses an apparatus for measuring the squareness of an end surface of a columnar pin to a longitudinal center line of the pin. Here, a pointed end of a stopper is brought into contact with the rotation center of one end surface of the pin while it is rotated. Then, the one end surface is scanned from the rotation center to the outer edge in its radial direction by a laser beam from a laser displacement gauge, and the squareness of the one end surface is measured.

The above described conventional squareness measuring apparatus cannot measure the squareness of each end surface of a partition wall in a hole of a cylinder to the longitudinal center line of the cylinder.

Jpn. Pat. Appln. KOKAI Publication No. 11-295005 discloses specifically an apparatus for measuring the squareness of an actuator mounting surface of a valve box to the longitudinal center line of a valve shaft projecting out from the actuator mounting surface. Here, a bracket supporting a dial gauge is rotatably held on a part of the valve shaft projecting out from the actuator mounting surface. While the bracket rotates on the valve shaft, the height of the actuator mounting surface (that is, the squareness of the actuator mounting surface to the longitudinal center line of the valve shaft) is measured by the dial gauge held by the bracket.

The above described conventional squareness measuring apparatus cannot measure the squareness of an end surface of a partition wall in a hole of a cylinder to the longitudinal center line of the cylinder.

BRIEF SUMMARY OF THE INVENTION

According to one aspect of the invention, a concentricity measuring apparatus for measuring concentricity of two holes in a cylindrical member, the cylindrical member having the two holes at both ends and a partition wall between the two holes, comprises: a rotation unit configured to support the cylindrical member and to rotate the cylindrical member about one of the two holes; and a concentricity measuring unit configured to measure the concentricity of a longitudinal center line of the other hole of the cylindrical member to a longitudinal center line of the one hole, by measuring a relative position of an inner circumferential surface of the other hole to the longitudinal center line of the one hole over the whole inner circumferential surface of the other hole, while the cylindrical member is rotated by the rotation unit.

According to one aspect of the invention, a method for measuring concentricity of two holes in a cylindrical member, the cylindrical member having the two holes at both ends and a partition wall between the two holes, comprises: supporting the cylindrical member and rotating the cylindrical member about one of the two holes; and measuring the concentricity of a longitudinal center line of the other hole to a longitudinal center line of the one hole, by measuring a relative position of the inner circumferential surface of the other hole to the longitudinal center line of the one hole over the whole inner circumferential surface of the other hole, while the cylindrical member is rotated by the rotation unit.

According to one aspect of the invention, a squareness measuring apparatus for measuring squareness of at least one end surface of a partition wall between two holes in a cylindrical member to a longitudinal center line of at least one of the two holes, the cylindrical member having the two holes at both ends and the partition wall between the two holes, comprises: a rotation unit configured to support the cylindrical member and to rotate the cylindrical member about the one hole; and a squareness measuring unit configured to measure the squareness of the at least one end surface of the partition wall to the longitudinal center line of the other hole in the other hole, by measuring a relative position of the at least one end surface of the partition wall along the longitudinal center line of the other hole in the other hole over the whole circumference of the at least one end surface of the partition wall, while the cylindrical member is rotated by the rotation unit.

According to one aspect of the invention, a method for measuring squareness of at least one end surface of a partition wall between two holes in a cylindrical member to a longitudinal center line of at least one of the two holes, the cylindrical member having the two holes at both ends and the partition wall between the two holes, comprises: supporting the cylindrical member and rotating the cylindrical member about the one hole; and measuring the squareness of the at least one end surface of the partition wall in the other hole to the longitudinal center line of the other hole, by measuring a relative position of the at least one end surface of the partition wall in the other hole along the longitudinal center line of the other hole over the whole circumference of the at least one end surface of the partition wall, while the cylindrical member is rotated by the rotation unit.

According to one aspect of the invention, a concentricity-squareness measuring apparatus for measuring concentricity of two holes in a cylindrical member, the cylindrical member having the two holes at both ends and a partition wall between the two holes, and for measuring squareness of at least one end surface of the partition wall to a longitudinal center line of at least one of the two holes, comprises: a rotation unit configured to support the cylindrical member and to rotate the cylindrical member about one of the two holes; a concentricity measuring unit configured to measure the concentricity of a longitudinal center line of the other hole of the cylindrical member to a longitudinal center line of the one hole, by measuring a relative position of an inner circumferential surface of the other hole to the longitudinal center line of the one hole over the whole inner circumferential surface of the other hole, while the cylindrical member is rotated by the rotation unit; and a squareness measuring unit configured to measure the squareness of the at least one end surface of the partition wall to the longitudinal center line of the other hole in the other hole, by measuring a relative position of the at least one end surface of the partition wall along the longitudinal center line of the other hole in the other hole over the whole circumference of the at least one end surface of the partition wall, while the cylindrical member is rotated by the rotation unit.

According to one aspect of the invention, a method for measuring concentricity of two holes in a cylindrical member, the cylindrical member having the two holes at both ends and a partition wall between the two holes, and for measuring squareness of at least one end surface of the partition wall to a longitudinal center line of at least one of the two holes, comprises: supporting the cylindrical member and rotating the cylindrical member about one of the two holes; measuring the concentricity of a longitudinal center line of the other hole of the cylindrical member to a longitudinal center line of the one hole, by measuring a relative position of an inner circumferential surface of the other hole to the longitudinal center line of the one hole over the whole inner circumferential surface of the other hole, while the cylindrical member is rotated by the rotation unit; and measuring the squareness of the at least one end surface of the partition wall to the longitudinal center line of the other hole in the other hole, by measuring a relative position of the at least one end surface of the partition wall along the longitudinal center line of the other hole in the other hole over the whole circumference of the at least one end surface of the partition wall, while the cylindrical member is rotated by the rotation unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One Embodiment

A concentricity-squareness measuring apparatus according to one embodiment of the invention will be explained with reference to FIG. 1 to FIG. 11.

The concentricity-squareness measuring apparatus according to the embodiment measures the concentricity of the two holes 11 and 12 formed at the both end surfaces 10a and 10b of the barrel member 10 that is described above with reference to FIGS. 13A and 13B and that is a kind of a conventional cylindrical member. The concentricity-squareness measuring apparatus further measures the squareness of the at least one end surface of the partition wall 13 between the two holes 11 and 12 in the barrel member 10 to the longitudinal center line of at least one of the two holes 11 and 12.

As shown in FIG. 1 to FIG. 4, a member support mechanism 21 is provided at about the middle of the upper surface of a base plate 20. The member support mechanism 21 includes a support block 22 placed at almost the middle of the upper surface of the base plate 20. As shown in FIG. 5, the support block 22 is fixed with bolts 23 at about the middle of the upper surface of the base plate.

The member support mechanism 21 further includes a V-block 25 placed on the upper surface of the support block 22, and a plate 26 covering an upper opening of the V-block 25. The V-block 25 is used for holding a cylindrical member support pin 24.

The V-block 25 and plate 26 are fixed to the upper surface of the support block 22 with bolts 27, as shown in detail in FIG. 5. A screw hole 28 passing in the vertical direction is formed in the middle of the plate 26 to correspond to the bottom of a V-groove 25a of the V-block 25. A wing bolt 29 is screwed into the screw hole 28. The lower end face of the wing bolt 29 screwed into the screw hole 28 faces the bottom of the V-groove 25a of the V-block 25. After one end portion of the cylindrical member support pin 24 is placed on the V-groove 25a, the lower end face of the wing bolt 29 presses the one end portion of the cylindrical member support pin 24 to the surface of the V-groove 25a and holds the one end portion of the member support pin 24 in cooperation with the surface of the V-groove 25a. The other end portion of the member support pin 24 is projected from a front side 25b of the V-block 25.

Figure 8:
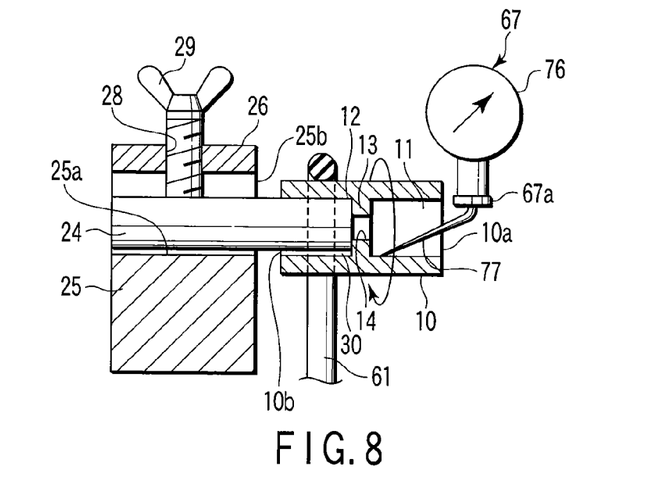
FIG. 8 is an enlarged schematic sectional view showing a state that the concentricity of the one hole of the cylindrical member is measured by the dial gauge for measuring concentricity in the concentricity-squareness measuring apparatus of FIG. 1.

The one hole 12 of the barrel member 10 is put on the other end portion (projected end portion) of the member support pin 24, as shown in detail in FIG. 8. The outer diameter of the member support pin 24 is a little smaller than the inner diameter of the hole 12 of the barrel member 10. Therefore, a clearance 30 is generated between the lower end of the other end portion (projected end portion) of the member support pin 24 and the lower end of the inner surface of the hole 12 of the barrel member 10, and the barrel member 10 is rotatable to the member support pin 24.

Figure 4:
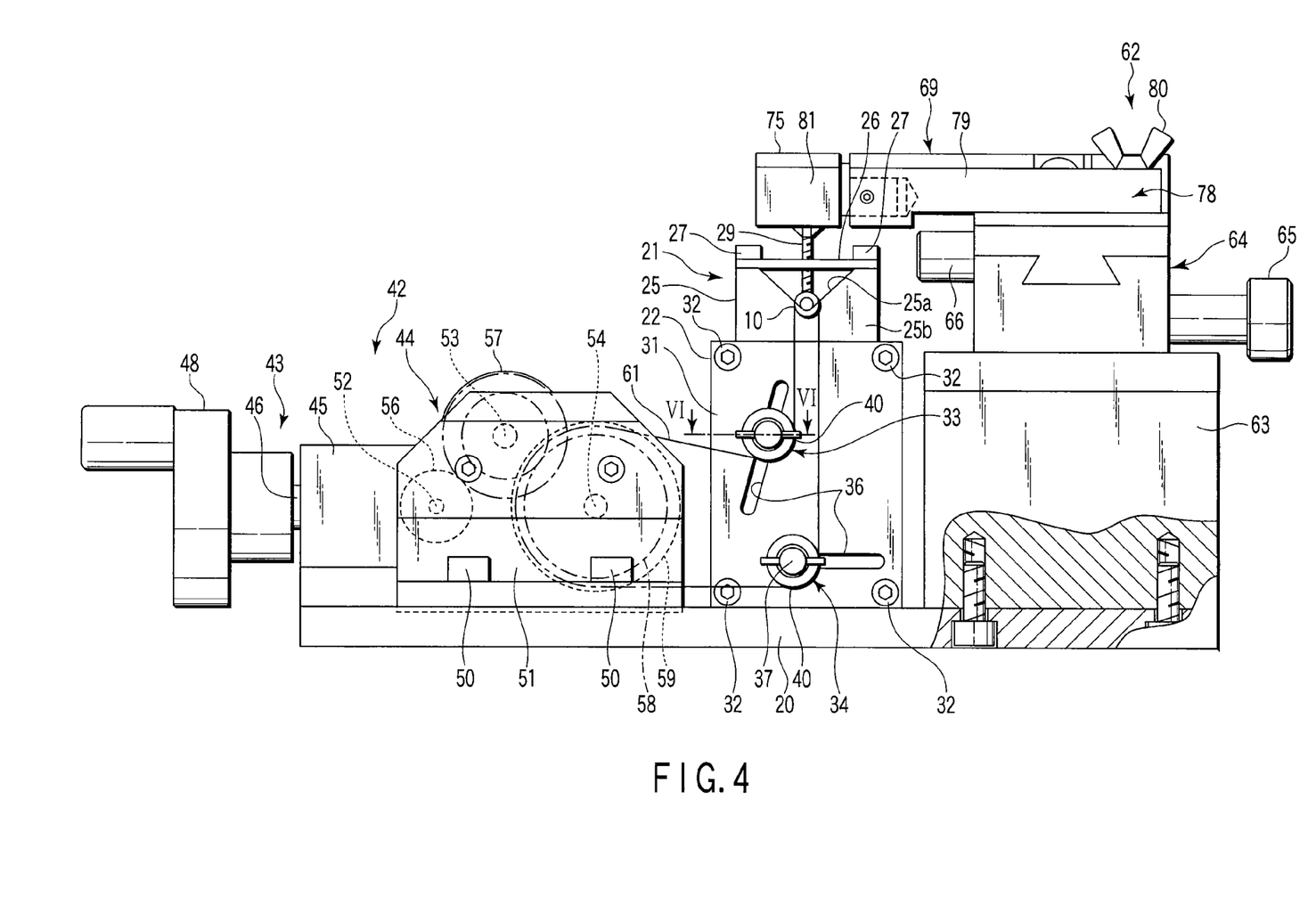
FIG. 4 is a schematic front view of the concentricity-squareness measuring apparatus of FIG. 1, in which the dial gauge for measuring concentricity and the dial gauge for measuring squareness are excluded.
Figure 5:
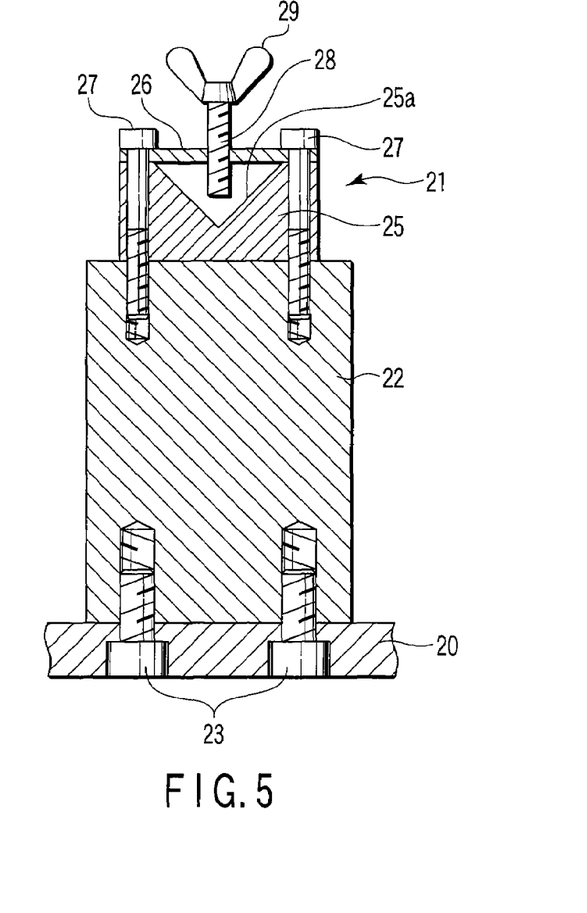
FIG. 5 is a sectional view taken along a line V-V of FIG. 3.

A front plate 31 is placed on the front surface of the support block 22, and is fixed to the front surface of the support block 22 with bolts 32 (shown only in FIG. 4 to make the drawing clear). In the front plate 31, a first guide roller 33 is provided to be vertically movable at a position below the barrel member 10 supported by the member support pin 24. Further, in the front plate 31, a second guide roller 34 is provided to be horizontally movable at a position below the first guide roller 33.

The structures for attaching the first and second guide rollers 33 and 34 to the front plate 31 are the same as to each other. Therefore, only the structure for attaching the first guide roller 33 to the front plate 31 will be explained.

Figure 6:
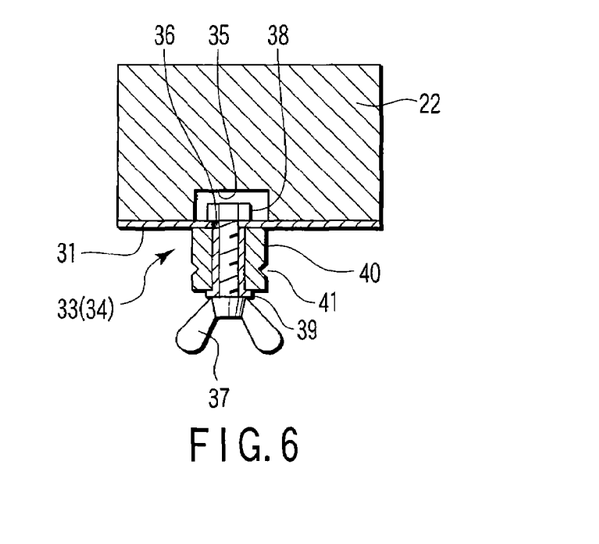
FIG. 6 is a sectional view taken along a line VI-VI of FIG. 4.

As shown in detail in FIG. 6, a long groove 35 and an elongated hole 36 are formed in elongated areas in the front surface of the support block 22 and in the front plate 31 to correspond to a predetermined moving path of the first guide roller 33. A wing bolt 37 is passed through the elongated hole 36 of the front plate 31, and the end portion of the wing bolt 37 is screwed into a nut 38 housed in the long groove 35 of the front surface of the support block 22. A roller main body 40 is rotatably held on the middle portion of the wing bolt 37 projected out from the front plate 31, through a collar 39. A circular groove 41 is provided on the outer circumferential surface of the roller main body 40, and an endless belt described later will be wound on the circular groove 41.

A rotation driving mechanism 42 is further provided on the upper surface of the base plate 20. The rotation driving mechanism 42 is used to rotate the barrel member 10 while the barrel member 10 is being supported by the member support pin 24 with the inner surface of the hole 12 being in contact with the outer surface of the member support pin 24.

In this embodiment, the rotation driving mechanism 42 provides a rotation unit for supporting the barrel member 10 and rotating the barrel member 10 about the hole 12, in cooperation with the member support mechanism 21.

The rotation driving mechanism 42 includes a rotation driving source 43 and a reduction mechanism 44. The rotation driving source 43 has a bearing block 45 fixed at a corner of the upper surface of the base plate 20. The bearing block 45 rotatably supports an input shaft 46 and an output shaft 47 (refer to FIG. 3). The rotation center line of the input shaft 46 and that of the output shaft 47 are arranged in parallel with the upper surface of the base plate 20 and to cross at right angles with each other. The input shaft 46 extends in a direction crossing the longitudinal center line of the member support pin 24 at right angles, and the output shaft 47 extends in the same direction as the projecting direction of the projected end portion of the member support pin 24.

A handle 48 which is to be held and operated by an operator is fixed to one end portion of the input shaft 46 far from the output shaft 47. The other end portion of the input shaft 46 close to the output shaft 47 is connected to one end portion of the output shaft 47 close to the other end portion the input shaft 46 through a known rotating force transmission mechanism, for example a pair of bevel gears, in a gear box 49.

The reduction mechanism 44 includes a pair of support plates 51 arranged in a side of the front surface of the support block 22 on the upper surface of the base plate 20. The support plates 51 extend in parallel to each other in a direction crossing the longitudinal center line of the member support pin 24, and are separated from each other in a direction along the longitudinal center line of the member support pin 24. Each support plate 51 is fixed to the upper surface of the base plate 20 with bolts 50. An input shaft 52, an idle shaft 53, and an output shaft 54 are arranged between the pair of support plates 51 to be separated from each other, to be in parallel to each other, and to sequentially close to the member support pin 24 in the above described order. Both end portions of each of the input shaft 52, the idle shaft 53, and the output shaft 54 are rotatably held by the pair of support plates 51.

One end portion of the input shaft 52 of the reduction mechanism 44 projects from the support plate 51 located in the rotation driving source side in the reduction mechanism 44 to close to the rotation driving source 43. The projected one end portion of the input shaft 52 is connected to the projected end portion of the output shaft 47 of the rotation driving source 43 through a coupling 55.

Between the pair of support plates 51, a first spur gear 56 is fixed to the input shaft 52, a second spur gear 57 is fixed to the idle shaft 53, and a third spur gear is fixed to the output shaft 54. The second spur gear 57 is a double gear, one of which engages with the first spur gear 56 and the other of which engages with the third spur gear 58. A rotating force input from the output shaft 47 of the rotation driving source 43 to the input shaft 52 of the reduction mechanism 44 is transmitted to the output shaft 54 through the first spur gear 56, the second super gear 57, and the third spur gear 58 in the reduction mechanism 44. During this rotating force transmission, the number of rotation of the input shaft 52 is reduced and transmitted to the output shaft 54.

Further, an output pulley 59 is arranged between the pair of support plates 51 of the reduction mechanism 44. The output pulley 59 is fixed to the output shaft 54 to be adjoining to the third spur gear 58. The output pulley 59 serves as an output member of the rotation driving mechanism 42. A circular groove 60 on the outer circumferential surface of the output pulley 59 is included in an imaginary plane erected on the upper surface of the base plate 20, together with the projected end portion of the member support pin 24 held by the member support mechanism 21 and the circular grooves 41 of the first and second guide rollers 33 and 34. An elastic endless belt 61 is wound on the circular groove 60 of the output pulley 59, the circular grooves 41 of the first and second guide rollers 34 and 34, and a portion corresponding to the one hole 12 on the outer circumferential surface of the barrel member 10 with the hole 12 being held rotatably on the projected end portion of the member support pin 24. The endless belt 61 transmits the rotating force from the output pulley 59 that is the output member of the rotation driving mechanism 42 to the outer surface of the barrel member 10 that is rotatably held by the projected end portion of the member support pin 24.

Each of the roller main bodies 40 of the first and second guide rollers 33 and 34 is movable along the corresponding elongated hole 36 of the front plate 31 by loosening the wing bolt 37. Therefore, the tension of the endless belt 61 can be adjusted by moving the roller main bodies 40 of the first and second guide rollers 33 and 34 along the corresponding elongated holes 36 of the front plate 31.

When the barrel member 10 is removed from the projected end portion of the member support pin 24, the endless belt 61 is separated from the outer surface of the barrel member 10 and is hung on the projected end portion of the member support pin 24, so that the endless belt 61 does not come off the circular groove 60 of the output pulley 59 and the circular grooves 41 of the first and second guide rollers 33 and 34.

An assembly 62 of concentricity measuring unit and squareness measuring unit is further provided on the upper surface of the base plate 20 in a side of the front surface of the support block 22 and opposite to the reduction mechanism 44. The concentricity measuring unit measures the concentricity of the two holes 11 and 12 of the barrel member 10, while the barrel member 10 is supported by the member support pin 24 of the member support mechanism 21 of the rotation unit and is rotated by the rotation driving mechanism 42 of the rotation unit as described above. The squareness measuring unit measures the squareness of the at least one end surface of the partition wall 13 to the longitudinal center line of the hole 11 or 12 of the barrel member 10.

The assembly 62 of concentricity measuring unit and squareness measuring unit includes a support base 63 fixed to the upper surface of the base plate 20 with not-shown bolts. An X-Y table 64 is mounted on the upper surface of the support base 63. The X-Y table 64 is movable to the upper surface of the base plate 20 in an imaginary X-Y plane being in parallel with the upper surface of the base plate 20 in an X direction (a direction crossing the longitudinal direction of the member support pin 24 at right angles) and in a Y direction (a direction along the longitudinal direction of the member support pin 24). The X-Y table 64 can be fixed at a desired position in the X and Y directions with a bolt 65 for adjusting a position in the X direction (refer to FIGS. 3 and 4) and a bolt 66 for adjusting a position in the Y direction (refer to FIG. 4).

A concentricity measuring unit that is a first dial gauge 67 in this embodiment, and a squareness measuring unit that is a second dial gauge 68 in this embodiment are mounted on the upper surface of the X-Y table 63.

More particularly, the first dial gauge 67 is supported by a concentricity measuring unit support mechanism 69 on the upper surface of the X-Y table 64. The concentricity measuring unit support mechanism 69 includes a fixed block 70 fixed with a bolt 71 on a portion of the upper surface of the X-Y table 64 close to the member support mechanism 21, and a vertical swing arm 73 having one end portion connected to the fixed block 70 to be vertically swingable by a pivot pin 72. The vertical swing arm 73 can be fixed at a desired position in the vertical direction around the pivot pin 72 by loosening and tightening a wing nut 74 screwed on the distal end portion of the pivot pin 72.

A support clamp 75 for detachably supporting a measuring probe holding member 67a of the first dial gauge 67 is attached on the other end portion (the front end portion) of the vertical swing arm 73.

The first dial gauge 67 includes a measured value indicating portion 76 to which one end of the measuring probe holding member 67a is fixed, and a measuring probe 77 projecting from the other end of the measuring probe holding member 67a. The diameter of the measuring probe 77 is smaller than the inner diameter of the other hole 11 of the barrel member 10 whose one hole 12 is supported by the member support pin 24 of the member support mechanism 21.

Figure 1:
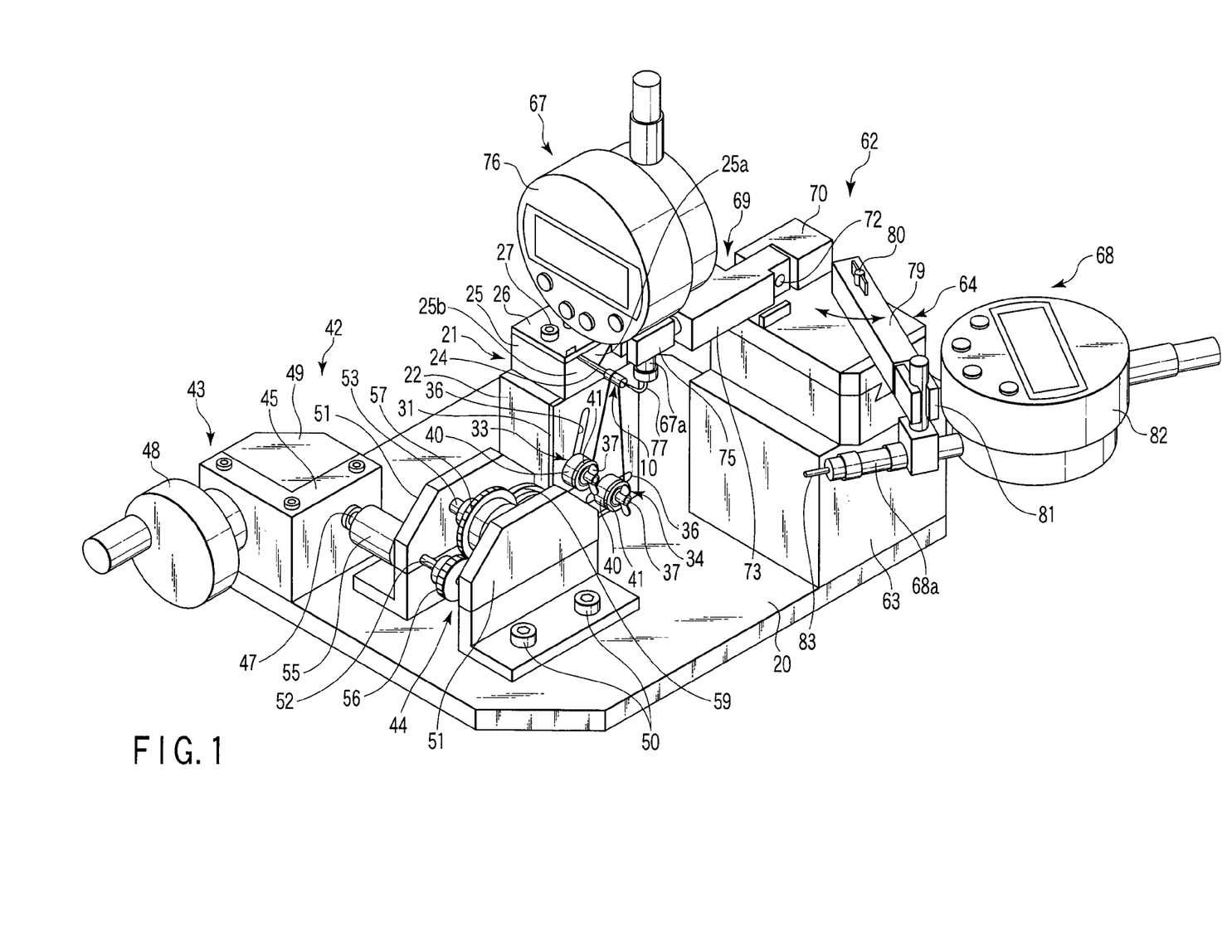
FIG. 1 is a schematic perspective view of a concentricity-squareness measuring apparatus according to an embodiment of the invention, in which the concentricity of one hole of a cylindrical member is measured.

When the vertical swing arm 73 is placed along the upper surface of the X-Y table 64 as shown in FIG. 1, the measuring probe holding member 67a of the first dial gauge 67 supported by the support clamp 75 is arranged to make the measuring probe 77 being movable in a direction perpendicular to the upper surface of the base plate 20.

The measuring probe 77 is inclined to gradually move sideways as it separating farther from the other end of the measuring probe holding member 76a. And, when the vertical swing arm 73 is placed along the upper surface of the X-Y table 64 as shown in FIG. 1, the distal end of the measuring probe 77 can be inserted into the other hole 11 of the barrel member 10 whose one end hole 12 is supported by the member support pin 24 of the member support mechanism 21. As shown in detail in FIG. 8, the distal end of the measuring probe 77 does not contact the other end surface 10a of the barrel member 10, while the distal end of the measuring probe 77 is moved from the outer end to the inner end (that is, the end face of the partition wall 13) in the other hole 11 in a state that the distal end of the measuring probe 77 is in contact with the inner surface of the other hole 11. Namely, free moving of the measuring probe 77 to the measuring probe holding member 67a is not interrupted.

The second dial gauge 68 is supported on the upper surface of the X-Y table 64 by a squareness measuring unit support mechanism 78. The squareness measuring unit support mechanism 78 includes a horizontal swing arm 79 placed at a position on the upper surface of the X-Y table 64, the position being farther from the member support mechanism 21 than the concentricity measuring unit support mechanism 69 in the direction along the longitudinal center line of the member support pin 24.

Figure 2:
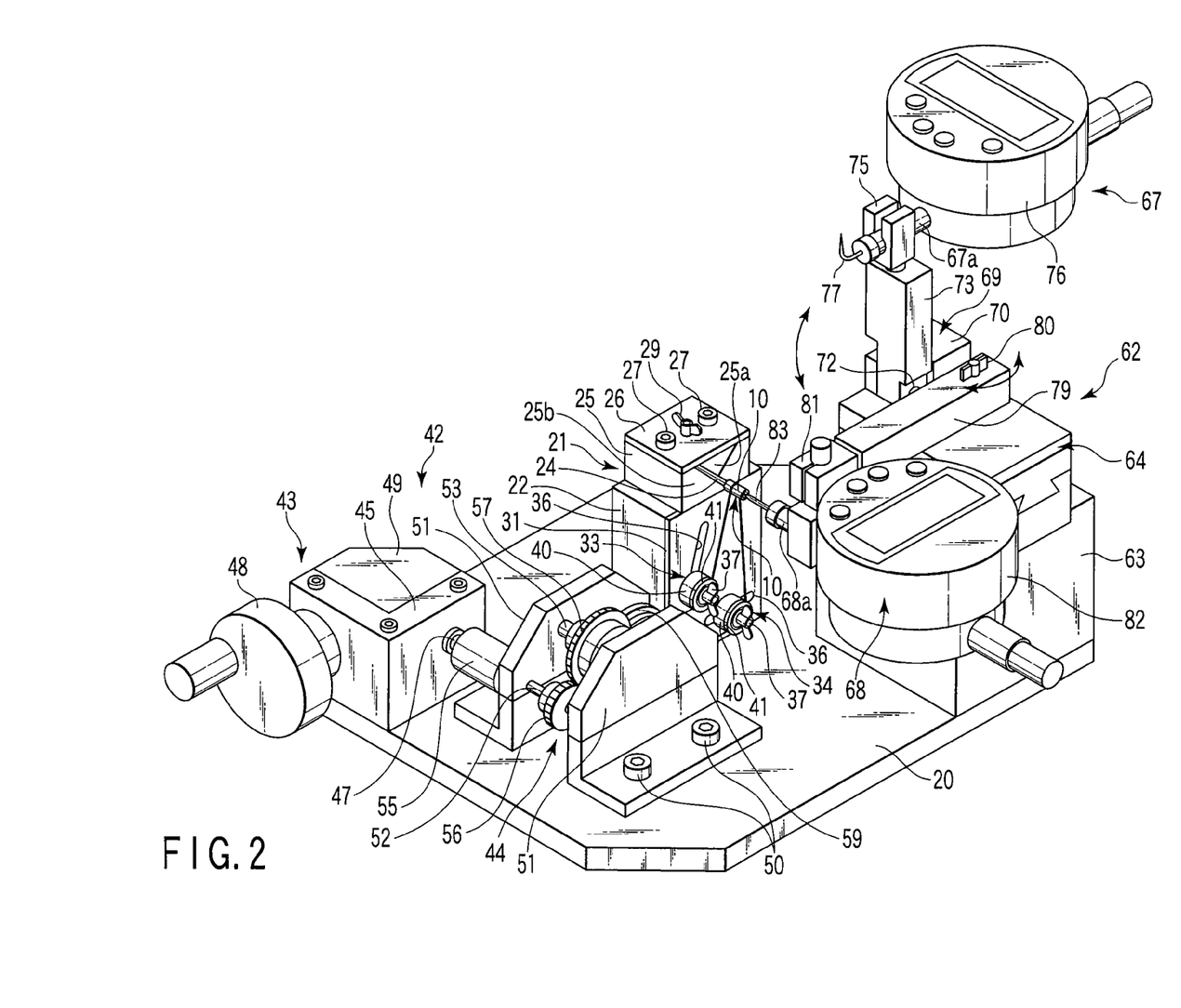
FIG. 2 is a schematic perspective view of the concentricity-squareness measuring apparatus of FIG. 1, in which the squareness of a partition wall of a cylindrical member is measured.
Figure 3:
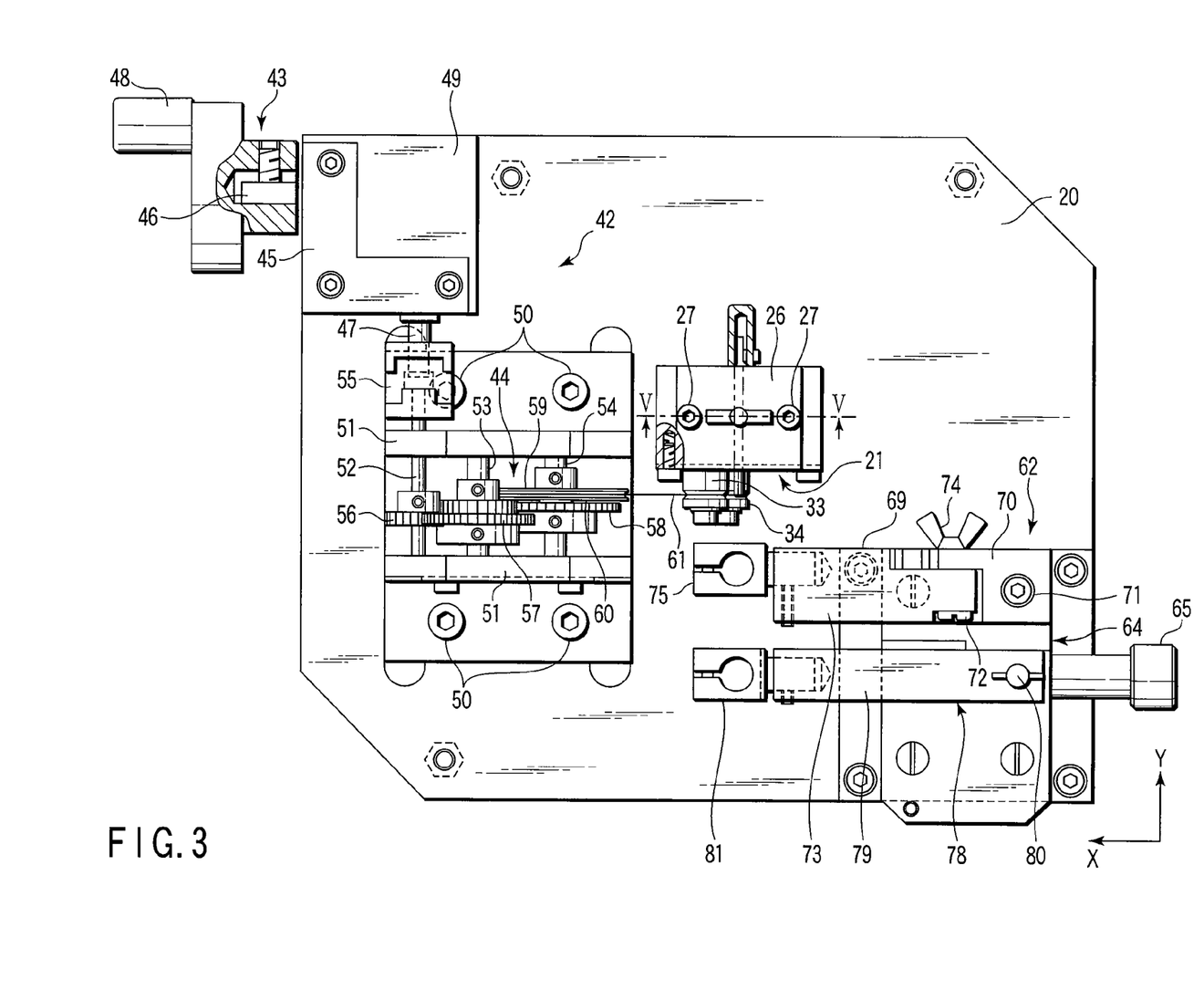
FIG. 3 is a schematic plan view of the concentricity-squareness measuring apparatus of FIG. 1, in which a dial gauge for measuring concentricity and a dial gauge for measuring squareness are excluded.

One end portion of the horizontal swing arm 79 located near to the fixed block 70 of the concentricity measuring unit support mechanism 69 is attached to the upper surface of the X-Y table 64 with a wing bolt 80. As a result, the horizontal swing arm 79 is swingable around the wing bolt 80 at one end portion along the upper surface of the X-Y table 64 between a separate position and a close position. At the separate position, the other end portion of the horizontal swing arm 79 is located away from the vertical swing arm 73 of the concentricity measuring unit support mechanism 69 (that is, the other end portion is located away from the member support pin 24), as shown in FIG. 1. At the close position, the other end portion of the horizontal swing arm 79 is located near to the vertical swing arm 73 of the concentricity measuring unit support mechanism 69 (that is, the other end portion is located near to the member support pin 24), as shown in FIGS. 2 and 3.

The horizontal swing arm 79 can be fixed at a desired position between the separate position and the close position by loosening and tightening the wing bolt 80.

A support clamp 81 for detachably supporting a measuring probe holding member 68a of the second dial gauge 68 is attached on the other end portion (front end portion) of the horizontal swing arm 79.

The second dial gauge 68 includes a measured value indicating portion 82 at which one end of the measuring probe holding member 68a is fixed, and a measuring probe 83 projected straight from the other end of the measuring probe holding member 68a. The diameter of the measuring probe 83 is smaller than the inner diameter of the other hole 11 of the barrel member 10 whose one hole 12 is supported by the member support pin 24 of the member support mechanism 21.

When the horizontal swing arm 79 is arranged at the close position as shown in FIG. 2, the measuring probe holding member 68a of the second dial gauge 68 supported by the support clamp 81 can insert the measuring probe 83 into the other hole 11 of the barrel member 10 whose one hole 12 is supported by the member support pin 24 of the member support mechanism 21. As shown in detail in FIG. 10, the measuring probe 83 is not in contact with the inner surface of the other hole 11 and the other end surface 10a of the barrel member 10 while the distal end of the measuring probe 83 moves from the outer end to the inner end (that is, the end surface of the partition wall 13) in the other hole 11. Namely, free movement of the measuring probe 83 to the measuring probe holding member 68a is not interrupted.

Figure 11:
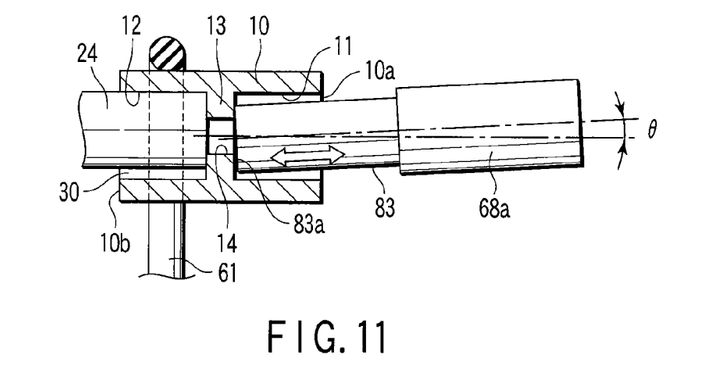
FIG. 11 is a more enlarged schematic sectional view showing the state that the squareness of the one end surface of the partition wall of the cylindrical member is measured by the dial gauge for measuring squareness in the concentricity-squareness measuring apparatus of FIG. 1.

As shown in FIG. 11, a distal end surface 83a of the measuring probe 83 is formed as a flat plane crossing the longitudinal center line of the measuring probe 83 at right angles. The measuring probe 83 is inserted into the other hole 11 of the barrel member 10 whose one hole 12 is supported by the member support pin 24 of the member support mechanism 21, so that an inclined angle θ of the measuring probe 83 to the longitudinal center line of the member support pin 24 is more than 2° and a part of the flat distal end surface 83a is only brought into contact with the end surface of the partition wall 13 in the other hole 11.

Next, an operation of the concentricity-squareness measuring apparatus according to the first embodiment configured as described above will be explained.

In an initial state of the assembly 62 of concentricity measuring unit-squareness measuring unit, the vertical swing arm 73 of the concentricity measuring unit support mechanism 69 is located at the upper position as shown in FIG. 2, and the horizontal swing arm 79 of the squareness measuring unit support mechanism 78 is placed at the separate position as shown in FIG. 1.

Next, while the endless belt 61 of the rotation driving mechanism 42 is removed from the other end portion (the projected end portion) of the member support pin 24 whose proximal end portion is held in the V-groove 25a of the V-block 25 of the member support mechanism 21 by the wing bolt 29, the one hole 12 of the barrel member 10 is fit on the projected end portion of the member support pin 24 as shown in detail in FIG. 8. Then, the endless belt 61 of the rotation driving mechanism 42 is wound on the area corresponding to the hole 12 on the outer circumferential surface of the barrel member 10.

The upper end of the inner circumferential surface of the hole 12 of the barrel member 10 is pressed on the upper end of the outer circumferential surface of the projected end portion of the member support pin 24 by the tensile force of the endless belt 61, and the clearance 30 is made between the lower end of the inner circumferential surface of the hole 12 of the barrel member 10 and the lower end of the outer circumferential surface of the projected end portion of the member support pin 24.

Next, the concentricity of the two holes 11 and 12 in the barrel member 10 will be measured.

Figure 7:
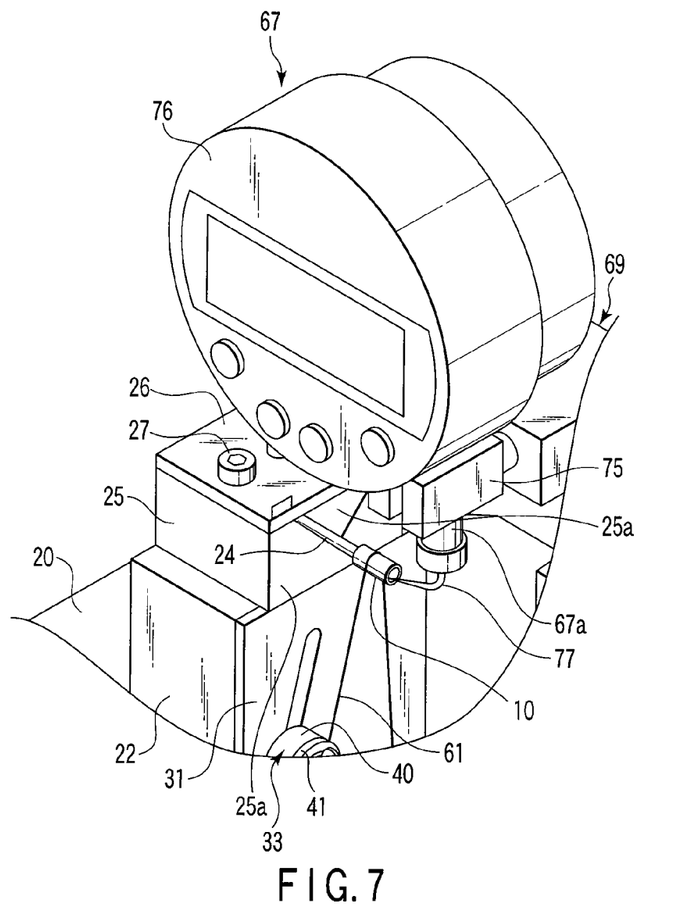
FIG. 7 is an enlarged perspective view showing an area close to the dial gauge for measuring concentricity in the concentricity-squareness measuring apparatus of FIG. 1.

The vertical swing arm 73 of the concentricity measuring unit is located in the lower position as shown in FIG. 1. The distal end of the measuring probe 77 of the first dial gauge 67 of the concentricity measuring unit is inserted into the other hole 11 of the barrel member 10 whose one hole 12 is supported by the member support pin 24, as shown in FIG. 7. The X-Y table 64 of the assembly 62 is moved in the X and Y directions by operating the bolt 65 for adjusting the position in the X direction and bolt 66 for adjusting the position in the Y direction to make the distal end of the measuring probe 77 of the first dial gauge 67 being in contact with the outer end on the lower end of the inner circumferential surface of the other hole 11 as shown in FIG. 8.

Next, the handle 48 of the rotation driving source 43 of the rotation driving mechanism 42 is rotated by the operator, so that the rotating force applied to the handle 48 is transmitted to the input shaft 52 of the reduction mechanism 44 through the input shaft 46, the not-shown bevel gears in the gear box 49, the output shaft 47, and the coupling 55. The rotating force transmitted to the input shaft 52 of the reduction mechanism 44 is further transmitted to the output pulley 59 (output member) of the output shaft 54 through the first spur gear 56, the second spur gear 57, and the third spur gear 58 in the reduction mechanism 44.

The above described rotating force is further transmitted from the output pulley 59 to the barrel member 10 on the member support pin 24 through the endless belt 61. By the above described rotating force, the barrel member 10 rotates on the projected end portion of the member support pin 24 with the upper end of the inner circumferential surface of the one hole 12 being sliding on the upper end of the outer circumferential surface of the projected end portion of the member support pin 24. During this time rotation, the measuring probe 77 of the first dial gauge 67 being in contact with the outer end of the inner circumferential surface of the other hole 11 of the barrel member 10 transmits the displacement of the measuring probe 77 over the whole inner circumferential surface at the outer end to the measured value indicating portion 76. As a result, the displacement of the outer end of the inner circumferential surface of the other hole 11 to the whole inner circumferential surface of the one hole 12 on the member support pin 24 is known, and the concentricity of the outer end of the other hole 11 to the one hole 12 is known.

The X-Y table 64 of the assembly 62 is moved toward the proximal end portion of the member support pin 24 along the longitudinal center line of the member support pin 24 by adjusting the bolt 65 for adjusting the position in the X direction and the bolt 65 for adjusting the position in the Y direction. By this movement of the X-Y table 64, the distal end of the measuring probe 77 of the first dial gauge 67 of the concentricity measuring unit can be moved from the outer end to the inner end on the inner circumferential surface of the hole 11 with the distal end of the measuring probe 77 being in contact with the lower end of the inner circumferential surface of the hole 11 while the one hole 12 of the barrel member 10 is supported on the member support pin 24.

Therefore, the measuring probe 77 of the first dial gauge 67 the proximal end portion of which is in contact with the outer end of the inner circumferential surface of the hole 11 of the barrel member 10 can measure the displacement on the whole inner circumferential surface of the hole 11 at any position along the longitudinal center line of the hole 11 ranging from the outer end to the inner end of the inner circumferential surface of the hole 11. As a result, the displacement of the whole inner circumferential surface of the other hole 11 ranging from the outer end to the inner end to the whole inner circumferential surface of the one hole 12 on the member support pin 24 is known, and the concentricity of the other hole 11 ranging from the outer end to the inner end to the one hole 12 is known.

The measured value displayed on the measured value indicating portion 76 of the first dial gauge 67 can be stored in a memory device built in or connected to the measured value indicating portion 76. This makes a recording work for recording the measured values being easy as compared with that the operator reads the measured values displayed on the measured value indicating portion 76 and writes the measured values on a recording medium such as paper. In addition, all of the measured values stored in the memory device can be read out at once, and can be displayed as a table or a graph on a recording paper or a display unit.

Next, the squareness of the end surface of the partition wall 13 in the other hole 11 of the barrel member 10 to the longitudinal center line of the one hole 12.

The X-Y table 64 of the assembly 62 is moved in the X and Y directions by adjusting the bolt 65 for adjusting the position in the X direction and the bolt 66 for adjusting the position in the Y direction, so that the distal end of the measuring probe 77 of the first dial gauge 67 of the concentricity measuring unit is removed from the hole 11 of the barrel member 10 on the member support pin 24. Then, the vertical swing arm 73 of the concentricity measuring unit support mechanism 69 is moved to the upper position as shown in FIG. 2, and the horizontal swing arm 79 of the squareness measuring unit support mechanism 78 is moved to the close position as shown in FIG. 2.

Figures 9, 10:
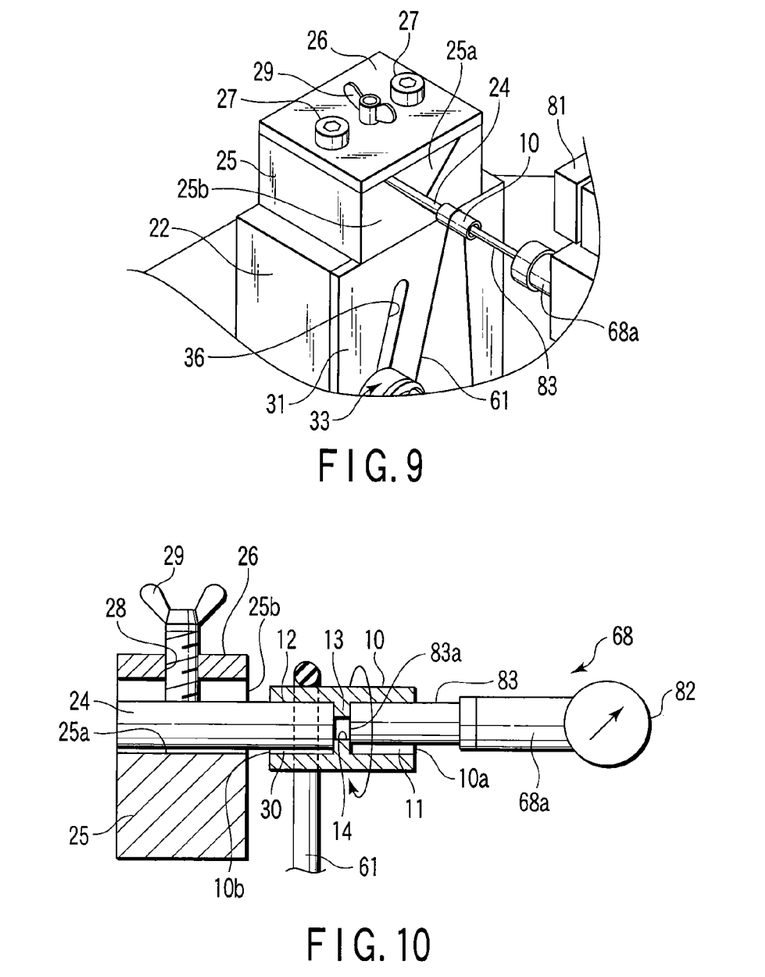
FIG. 9 is an enlarged perspective view showing an area close to the dial gauge for measuring squareness in the concentricity-squareness measuring apparatus of FIG. 1.
FIG. 10 is an enlarged schematic sectional view showing a state that the squareness of one end surface of the partition wall of the cylindrical member is measured by the dial gauge for measuring squareness in the concentricity-squareness measuring apparatus of FIG. 1.

The distal end portion of the measuring probe 83 of the second dial gauge 68 of the squareness measuring unit is inserted into the other hole 11 of the barrel member 10 whose one hole 12 is supported on the member support pin 24, as shown in FIG. 9. Further, the X-Y table 64 of the assembly 62 is moved in the X and Y directions by adjusting the bolt 65 for adjusting the position in the X direction and the bolt 66 for adjusting the position in the Y direction, so that the distal end face 83a of the distal end portion is in contact with the end surface of the partition wall 13 in the hole 11, as shown in FIG. 10.

Next, the handle 48 of the rotation driving source 43 of the rotation driving mechanism 42 is rotated by the operator. The rotating force from the rotation driving source 43 is transmitted to the barrel member 10 supported on the member support pin 24, through the output pulley 59 as the output member of the reduction mechanism 44 and the endless belt 61, as described hereinbefore.

While the barrel member 10 is rotated on the projected end portion of the member support pin 24 by the above rotating force, the measuring probe 83 of the second dial gauge 68 whose distal end face 83a is in contact with the end surface of the partition wall 13 in the hole 11 of the barrel member 10 is displaced along the longitudinal center line of the measuring probe holding member 68a in response to the inclination (squareness) of the end surface of the partition wall 13 to the rotation center line of the hole 12, and transmits the displacement over the whole circumference of the end surface to the measured value indicating portion 82. As a result, the displacement of the whole circumference of the end surface of the partition wall 13 in the other hole 11 along the longitudinal center line of the hole 12 on the member support pin 24 is known, and the squareness of the end surface of the partition wall 13 in the hole 11 to the longitudinal center line of the hole 12 is known.

The measured value displayed on the measured value indicating portion 82 of the second dial gauge 68 can be stored in a memory device built in or connected to the measured value indicating portion 82. This makes a recording work for recording the measured values being easy as compared with that the operator reads the measured values displayed on the measured value indicating portion 82 and writes the measured values on a recording medium such as paper. In addition, all of the measured values stored in the memory device can be read out at once, and can be displayed as a table or a graph on a recording paper or a display unit.

After the measurement for the concentricity of the other hole 11 to the one hole 12 in one barrel member 10 1 and that for the squareness of the end surface of the partition wall 13 in the other hole 11 are finished, the endless belt 61 is removed from the outer surface of the barrel member 10 supported on the member support pin 24. During this time, the measured barrel member 10 is removed from the projected end portion of the member support pin 24, and the one hole 12 of a new barrel member 10 is fit on the projected end portion of the member support pin 24. Further, the endless belt 61 is wound again on the area corresponding to the one hole 12 on the outer circumferential surface of the new barrel member 10.

Thereafter, the concentricity and squareness for the new barrel member 10 can be measured easily, speedily and accurately by using the first dial gauge 67 of the concentricity measuring unit and the second dial gauge 68 of the squareness measuring unit, as described hereinbefore.

[Modification]

Figure 12:
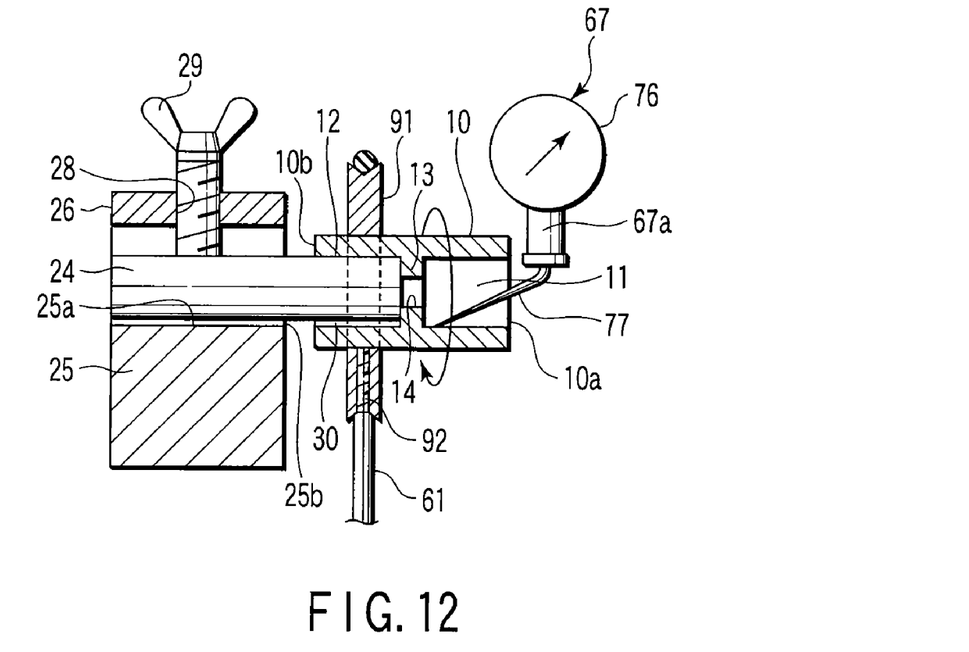
FIG. 12 is an enlarged schematic sectional view showing a modification of a rotation mechanism of a rotation unit in the concentricity-squareness measuring apparatus according to the embodiment of the invention.

FIG. 12 is an enlarged schematic sectional view showing a modification of the rotation driving mechanism 42 of the rotation unit in the concentricity-squareness measuring apparatus according to the embodiment described above with reference to FIGS. 1-11.

Only the difference of the rotation driving mechanism 42 of this modification from the rotation driving mechanism 42 of the embodiment is that the endless belt 61 is not directly wound on the outer circumferential surface of the barrel member 10 supported by the member support pin 24, and that an input pulley 91 is removably fixed to the area corresponding to the one hole 12 on the outer circumferential surface of the barrel member 10 by a fixing screw 92 and the endless belt 61 is wound on the outer circumferential groove of the input pulley 91.

As described hereinbefore, the inner diameter of each of the holes 11 and 12 of the barrel member 10 is small such as about 0.8 mm-about 1 mm, and the outer diameter of the barrel member 10 is just a little larger than the inner diameter of each hole. Therefore, by using the input pulley 91, the transmitting efficiency of the rotating force from the rotation driving mechanism 42 to the barrel member 10 is increased as compared with that the endless belt 61 is directly wound on the outer circumferential surface of the barrel member 10.

In the above described embodiment, the member support pin 24 for rotatably supporting the barrel member 10 is shaped like a columnar bar. However, according to the concept of the invention, the member support pin 24 may have any cross section, as far as it can be inserted into the hole 11 or 12 of the barrel member 10 and permit free rotation of the barrel member 10.

Further, in the above described embodiment, the rotation driving source 43 of the rotation driving mechanism 42 generates a rotating force from a human power applied to the handle 48, but the output shaft 47 may be rotated by an electric motor.

The structure of the reduction mechanism 44 may be various known structures for reducing a rotation speed, other than the combination of the spur gears.

The rotating force from the rotation driving source 43 of the rotation driving mechanism 42 may be transmitted to the barrel member 10 by a friction roller which can be in contact with and separate from the outer circumferential surface of the barrel member 10 rotatably supported on the member support pin 24, other than by the endless belt 61.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A concentricity measuring apparatus for measuring concentricity of two holes in a cylindrical member, the cylindrical member having the two holes at both ends and a partition wall between the two holes, comprising: a rotation unit configured to rotate the cylindrical member about one of the two holes; and a concentricity measuring unit configured to measure the concentricity of a longitudinal center line of the other hole of the cylindrical member to a longitudinal center line of the one hole, by measuring a relative position of an inner circumferential surface of the other hole to the longitudinal center line of the one hole over the whole inner circumferential surface of the other hole, while the cylindrical member is rotated by the rotation unit.

2. The concentricity measuring apparatus according to claim 1, wherein a support member is in contact with an inner circumferential surface of the one hole of the cylindrical member and supporting the cylindrical member, and a rotation driving mechanism rotating the cylindrical member while the support member is in contact with the inner circumferential surface of the one hole.

3. The concentricity measuring apparatus according to claim 2, wherein the rotation driving mechanism is in contact with an outer circumferential surface of the cylindrical member and gives a rotation force to the cylindrical member.

4. The concentricity measuring apparatus according to claim 3, wherein the rotation driving mechanism includes a rotation driving source generating the rotation force, an output member outputting the rotation force from the rotation driving source, and an endless belt wound on an outer circumferential surface of the output member and an outer circumferential surface of the cylindrical member.

5. The concentricity measuring apparatus according to claim 1, wherein the concentricity measuring unit is in contact with the inner circumferential surface of the other hole of the cylindrical member and measures the relative position of the inner circumferential surface of the other hole to the longitudinal center line of the one hole over the whole inner circumferential surface of the other hole, while the cylindrical member is rotated by the rotation unit.

6. The concentricity measuring apparatus according to claim 5, wherein the concentricity measuring unit includes a probe configured to be inserted into the other hole of the cylindrical member and to be in contact with the inner circumferential surface of the other hole from one end to the other end of the inner circumferential surface in a direction parallel to the longitudinal center line of the other hole, while the cylindrical member is rotated by the rotation unit, and the concentricity measuring unit inserts the probe into the other hole of the cylindrical member and makes the probe in contact with the inner circumferential surface of the other hole from the one end to the other end of the inner circumferential surface in a direction parallel to the longitudinal center line of the other hole, while the cylindrical member is rotated by the rotation unit, thereby measuring a relative position of the inner circumferential surface of the other hole to the longitudinal center line of the one hole over the whole inner circumferential surface of the other hole.

7. The concentricity measuring apparatus according to claim 6, wherein the concentricity measuring unit includes a dial gauge.

8. A method for measuring concentricity of two holes in a cylindrical member, the cylindrical member having the two holes at both ends and a partition wall between the two holes, comprising: supporting the cylindrical member and rotating the cylindrical member about one of the two holes; and measuring the concentricity of a longitudinal center line of the other hole to a longitudinal center line of the one hole, by measuring a relative position of the inner circumferential surface of the other hole to the longitudinal center line of the one hole over the whole inner circumferential surface of the other hole, while the cylindrical member is rotated by a rotation unit.

9. A squareness measuring apparatus for measuring squareness of at least one end surface of a partition wall between two holes in a cylindrical member to a longitudinal center line of at least one of the two holes, the cylindrical member having the two holes at both ends and the partition wall between the two holes, comprising: a rotation unit configured to rotate the cylindrical member about the one hole; and a squareness measuring unit configured to measure the squareness of the at least one end surface of the partition wall to the longitudinal center line of the other hole in the other hole, by measuring a relative position of the at least one end surface of the partition wall along the longitudinal center line of the other hole in the other hole over the whole circumference of the at least one end surface of the partition wall, while the cylindrical member is rotated by the rotation unit.

10. The squareness measuring apparatus according to claim 9, wherein the squareness measuring apparatus includes a support member being in contact with an inner circumferential surface of the one hole of the cylindrical member and supporting the cylindrical member, and a rotation driving mechanism rotating the cylindrical member while the support member is in contact with the inner circumferential surface of the one hole.

11. The squareness measuring apparatus according to claim 10, wherein the rotation driving mechanism is in contact with an outer circumferential surface of the cylindrical member and gives a rotation force to the cylindrical member.

12. The squareness measuring apparatus according to claim 11, wherein the rotation driving mechanism includes a rotation driving source generating the rotation force, an output member outputting the rotation force from the rotation driving source, and an endless belt wound on the outer circumferential surface of the output member and an outer circumferential surface of the cylindrical member.

13. The squareness measuring apparatus according to claim 9, wherein the squareness measuring unit is in contact with the at least one end surface of the partition wall in the other hole over the whole circumference of the at least one end surface of the partition wall while the cylindrical member is rotated by the rotation unit, and measures the relative position of the at least one end surface of the partition wall along the longitudinal center line of the other hole while the cylindrical member is rotated by the rotation unit.

14. The squareness measuring apparatus according to claim 13, wherein the squareness measuring unit includes a probe configured to be inserted into the other hole of the cylindrical member and to be in contact with the at least one end surface of the partition wall in the other hole over the whole circumference of the at least one end surface of the partition wall, while the cylindrical member is rotated by the rotation unit, and the squareness measuring unit inserts the probe into the other hole of the cylindrical member, making the probe in contact with the at least one end surface of the partition wall, and measuring a relative position of the at least one end surface of the partition wall in the other hole along the longitudinal center line of the other hole over the whole circumference of the at least one end surface of the partition wall, while the cylindrical member is rotated by the rotation unit, thereby measuring the squareness of the at least one end surface of the partition wall to the longitudinal center line of the other hole.

15. The squareness measuring apparatus according to claim 14, wherein the squareness measuring unit includes a dial gauge.

16. A method for measuring squareness of at least one end surface of a partition wall between two holes in a cylindrical member to a longitudinal center line of at least one of the two holes, the cylindrical member having the two holes at both ends and the partition wall between the two holes, comprising: supporting the cylindrical member and rotating the cylindrical member about the one hole; and measuring the squareness of the at least one end surface of the partition wall in the other hole to the longitudinal center line of the other hole, by measuring a relative position of the at least one end surface of the partition wall in the other hole along the longitudinal center line of the other hole over the whole circumference of the at least one end surface of the partition wall, while the cylindrical member is rotated by a rotation unit.

17. A concentricity-squareness measuring apparatus for measuring concentricity of two holes in a cylindrical member, the cylindrical member having the two holes at both ends and a partition wall between the two holes, and for measuring squareness of at least one end surface of the partition wall to a longitudinal center line of at least one of the two holes, comprising: a rotation unit configured to rotate the cylindrical member about one of the two holes; a concentricity measuring unit configured to measure the concentricity of a longitudinal center line of the other hole of the cylindrical member to a longitudinal center line of the one hole, by measuring a relative position of an inner circumferential surface of the other hole to the longitudinal center line of the one hole over the whole inner circumferential surface of the other hole, while the cylindrical member is rotated by the rotation unit; and a squareness measuring unit configured to measure the squareness of the at least one end surface of the partition wall to the longitudinal center line of the other hole in the other hole, by measuring a relative position of the at least one end surface of the partition wall along the longitudinal center line of the other hole in the other hole over the whole circumference of the at least one end surface of the partition wall, while the cylindrical member is rotated by the rotation unit.

18. The concentricity-squareness measuring apparatus according to claim 17, wherein the concentricity-squareness measuring apparatus includes a support member being in contact with an inner circumferential surface of the one hole of the cylindrical member and supporting the cylindrical member, and a rotation driving mechanism rotating the cylindrical member while the support member is in contact with the inner circumferential surface of the one hole.

19. The concentricity-squareness measuring apparatus according to claim 18, wherein the rotation driving mechanism is in contact with an outer circumferential surface of the cylindrical member and gives a rotation force to the cylindrical member.

20. The concentricity-squareness measuring apparatus according to claim 19, wherein the rotation driving mechanism includes a rotation driving source generating the rotation force, an output member outputting the rotation force from the rotation driving source, and an endless belt wound on an outer circumferential surface of the output member and the outer circumferential surface of the cylindrical member.

21. The concentricity-squareness measuring apparatus according to claim 17, wherein the concentricity measuring unit is in contact with the inner circumferential surface of the other hole of the cylindrical member and measures a relative position of the inner circumferential surface of the other hole to the longitudinal center line of the one hole over the whole inner circumferential surface of the other hole, while the cylindrical member is rotated by the rotation unit, and the squareness measuring unit is in contact with the at least one end surface of the partition wall in the other hole over the whole circumference of the at least one end surface of the partition wall while the cylindrical member is rotated by the rotation unit, and measures the relative position of the at least one end surface of the partition wall along the longitudinal center line of the other hole while the cylindrical member is rotated by the rotation unit.

22. The concentricity-squareness measuring apparatus according to claim 21, wherein the concentricity measuring unit includes a probe configured to be inserted into the other hole of the cylindrical member and to be in contact with the inner circumferential surface of the other hole from one end to the other end of the inner circumferential surface in a direction parallel to the longitudinal center line of the other hole, while the cylindrical member is rotated by the rotation unit, and the concentricity measuring unit inserts the probe into the other hole of the cylindrical member and makes the probe being in contact with the inner circumferential surface of the other hole from the one end to the other end of the inner circumferential surface in a direction parallel to the longitudinal center line of the other hole, while the cylindrical member is rotated by the rotation unit, thereby measuring the relative position of the inner circumferential surface of the other hole to the longitudinal center line of the one hole over the whole inner circumferential surface of the other hole; and wherein the squareness measuring unit includes a probe configured to be inserted into the other hole of the cylindrical member and to be in contact with the at least one end surface of the partition wall in the other hole over the whole circumference of the at least one end surface of the partition wall, while the cylindrical member is rotated by the rotation unit, and the squareness measuring unit inserts the probe into the other hole of the cylindrical member, making the probe in contact with the at least one end surface of the partition wall, and to measure the relative position of the at least one end surface of the partition wall in the other hole along the longitudinal center line of the other hole over the whole circumference of the at least one end surface of the partition wall, while the cylindrical member is rotated by the rotation unit, thereby measuring the squareness of the at least one end surface of the partition wall to the longitudinal center line of the other hole.

23. The concentricity-squareness measuring apparatus according to claim 22, wherein at least one of the concentricity measuring unit and the squareness measuring unit includes a dial gauge.

24. A method for measuring concentricity of two holes in a cylindrical member, the cylindrical member having the two holes at both ends and a partition wall between the two holes, and for measuring squareness of at least one end surface of the partition wall to a longitudinal center line of at least one of the two holes, comprising: supporting the cylindrical member and rotating the cylindrical member about one of the two holes; measuring the concentricity of a longitudinal center line of the other hole of the cylindrical member to a longitudinal center line of the one hole, by measuring a relative position of an inner circumferential surface of the other hole to the longitudinal center line of the one hole over the whole inner circumferential surface of the other hole, while the cylindrical member is rotated by the rotation unit; and measuring the squareness of the at least one end surface of the partition wall to the longitudinal center line of the other hole in the other hole, by measuring a relative position of the at least one end surface of the partition wall along the longitudinal center line of the other hole in the other hole over the whole circumference of the at least one end surface of the partition wall, while the cylindrical member is rotated by the rotation unit.

* * * * *